US012763593B2

(12) United States Patent
Liu et al.

(10) Patent No.: US 12,763,593 B2
(45) Date of Patent: Oct. 13, 2026

(54) CHARGING POST CONTROLLER WITH FUNCTIONAL MODULES CONNECTED BY MEANS OF PCB, AND CHARGING POST THEREOF

(71) Applicant: Sichuan Injet New Energy Co., Ltd., Deyang City (CN)

(72) Inventors: Shaode Liu, Deyang City (CN); Xiaofa Chen, Deyang City (CN); Gang Huang, Deyang City (CN)

(73) Assignee: SICHUAN INJET NEW ENERGY CO., LTD., Deyang City (CN)

( * ) Notice: Subject to any disclaimer, the term of this patent is extended or adjusted under 35 U.S.C. 154(b) by 230 days.

(21) Appl. No.: 18/648,605

(22) Filed: Apr. 29, 2024

(65) Prior Publication Data

US 2024/0275188 A1 Aug. 15, 2024

Related U.S. Application Data

(63) Continuation of application No. 17/419,194, filed as application No. PCT/CN2019/079783 on Mar. 27, 2019, now Pat. No. 12,046,934.

(30) Foreign Application Priority Data

Jan. 16, 2019 (CN) ......................... 201920072015.7

(51) Int. Cl.
*H02J 7/70* (2026.01)
*B60L 53/14* (2019.01)
(Continued)

(52) U.S. Cl.
CPC ................ *H02J 7/70* (2026.01); *B60L 53/14* (2019.02); *B60L 53/31* (2019.02); *H02J 7/80* (2026.01)

(58) Field of Classification Search
CPC ..... H02J 7/70; H02J 7/80; B60L 53/14; B60L 53/31; B60L 53/60; Y02T 90/14; Y02T 10/70; Y02T 10/7072; Y02T 90/12
(Continued)

(56) References Cited

U.S. PATENT DOCUMENTS

| | | | | |
|---|---|---|---|---|
| 6,100,670 A * | 8/2000 | Levesque | H02J 7/00 | 320/137 |
| 7,135,836 B2 * | 11/2006 | Kutkut | H02J 7/02 | 320/116 |

(Continued)

FOREIGN PATENT DOCUMENTS

| | | |
|---|---|---|
| CN | 205786927 U | 12/2016 |
| CN | 205871777 U | 1/2017 |

(Continued)

OTHER PUBLICATIONS

International Search Report dated Sep. 2, 2019; International Application No. PCT/CN2019/079783; 4 pgs.; CNIPA, Beijing, China.

*Primary Examiner* — M Baye Diao
(74) *Attorney, Agent, or Firm* — Central California IP Group, P.C.; Andrew D. Fortney

(57) ABSTRACT

A charging post controller with various functional modules connected by a PCB, and a charging post thereof. The controller includes a monitoring unit (1), a direct-current main loop unit (2) and a mounting and fixing unit (3), wherein the monitoring unit (1) comprises a PCB (11) and an electronic circuit forming electrically connected functional modules (4), and the functional modules (4) are mounted on the mounting and fixing unit (3), to form a laminated arrangement structure among the monitoring unit (1), the direct-current main loop unit (2) and the mounting and fixing unit (3). A charging post using the controller has a relatively high degree of integration, relatively small
(Continued)

overall volume and relatively low comprehensive cost, and is relatively easily promoted and applied.

20 Claims, 12 Drawing Sheets

(51) Int. Cl.
*B60L 53/31* (2019.01)
*H02J 7/80* (2026.01)

(58) Field of Classification Search
USPC .......................................................... 320/109
See application file for complete search history.

(56) References Cited

U.S. PATENT DOCUMENTS

| | | | | |
|---|---|---|---|---|
| 8,975,863 | B2 * | 3/2015 | Ranga | B60L 53/31 320/109 |
| 9,917,529 | B2 * | 3/2018 | Hattori | H02M 7/219 |
| 12,150,740 | B2 * | 11/2024 | Gopalakrishnan | A61B 5/1455 |
| 2001/0003416 | A1 * | 6/2001 | Kajiura | B60L 53/31 320/109 |

FOREIGN PATENT DOCUMENTS

| | | | | | |
|---|---|---|---|---|---|
| CN | 206259733 | U | | 6/2017 | |
| CN | 206272299 | U | | 6/2017 | |
| CN | 206283291 | U | * | 6/2017 | Y02T 10/70 |
| CN | 206962466 | U | | 2/2018 | |
| JP | 2016509824 | A | | 3/2016 | |

* cited by examiner

CHARGING POST CONTROLLER WITH FUNCTIONAL MODULES CONNECTED BY MEANS OF PCB, AND CHARGING POST THEREOF

CROSS-REFERENCE TO RELATED APPLICATIONS

This application is a continuation of U.S. patent application Ser. No. 17/419,194, filed Jun. 28, 2021, pending, which is a national stage application of International Pat. Appl. No. PCT/CN2019/079783, filed Mar. 27, 2019, expired, which claims priority to Chinese Pat. Appl. No. 201920072015.7, filed on Jan. 16, 2019, each of which is incorporated herein by reference in its entirety.

TECHNICAL FIELD

The present utility model relates to the technical field of charging posts, and relates to a charging post controller connected with various functional modules connected by means of a PCB, and a charging post thereof in particular.

BACKGROUND ART

With the development of new energy vehicles, use of electric vehicles is drawing more and more attentions from people. A charging post is an indispensable supporting device for normal use of electric vehicles, and is a key technology for developing the electric vehicles. The comprehensive costs of charging posts directly affect the application and development of electric vehicles.

FIG. 1 is a schematic diagram of the inner structure of a charging post with two charging guns in the current arrangement. For ensuring normal operation of the charging post, a monitoring unit and a direct-current main circuit unit electrically connected with each other are provided in the charging post at the same time. Monitoring functions such as control, monitoring, detection and measurement of a charging circuit are realized by the monitoring unit, and control functions such as break and contact, power allocation and over-current protection of the charging circuit are realized by the direct-current main circuit unit. The monitoring unit and the direct-current main circuit unit comprise several control modules and/or low-voltage electrical components with independent shells and wiring ports. These control modules and/or low-voltage electrical components are connected via wires, constituting a controller for controlling the charging loop of the charging post. When the charging post is made, various control modules and/or low-voltage electrical components are purchased from different manufacturers, are then provided at respective positions in the charging post with an arrangement manner, and wired manually and separately. In this way, various control modules and/or low-voltage electrical components are packaged separately, and occupy great space in the charging post, leading to great workloads in processing and assembling cabinets, and increasing an investment in the hardware cost when the charging post is made. Meanwhile, electrical connection between various devices is completed with the manner of greatly manual cable wiring, which enjoys a complicated process, and is greatly affected by human factors, leading to high human resource costs of the charging post and long production cycles, and also readily leading to low production efficiency and reliability of the charging post.

In summary, a technical solution is badly needed at the current stage to solve the technical problems, namely, various devices in an existing charging post are provided separately, electrical connection is carried out with the manner of manual cable wiring, which is a complicated process, leading to high investments in hardware cost and human resource cost of the charging post, and long production cycles, and low production efficiency and reliability.

Summary of the Utility Model

The object of the present utility model lies in: various functional modules in an existing charging post are provided independently, and are electrically connected with each other with the manner of manual cable wiring, presenting a complicate process, leading to the technical problems, namely, high investments in hardware cost and human resource cost of the charging post, and long production cycles, and low production efficiency and reliability. The utility model provides a charging post controller with various functional modules connected by means of a PCB, and a charging post thereof.

To realize the object above, the technical solutions used in the present utility mode are as follows:

A charging post controller with various functional modules connected by means of a PCB comprises a monitoring unit, a direct-current main loop unit and a mounting and fixing unit. The monitoring unit comprises several functional modules formed by combining a PCB and an electronic circuit. The functional modules are electrically connected by means of the PCB. The various functional modules are mounted on the mounting and fixing unit such that a laminated configuration structure is formed between the monitoring unit, the direct-current main loop unit and the mounting and fixing unit.

As for a charging post controller with various functional modules connected by means of a PCB in the present utility model, the monitoring unit and the direct-current main loop unit are integrated on a mounting and fixing unit such that the charging post controller formed has a compact structure and a small volume, greatly reducing the work of manual wire distribution and wiring when the controller is made. As a result, the controller may be produced in a streamlined manner, and has a simple manufacture process, a reduced cost in manufacture and improved production efficiency, reducing the comprehensive cost of controller, and has a broad applicable scope. Meanwhile, electrical connection of various functional modules in the monitoring unit of the charging post is realized by means of a PCB. Various functional modules no longer have independent shells and mutually connected terminals for connecting and tracing a long-distance cable, and no manual wiring and connection is required, either. The production efficiency and reliability are improved, and connecting lines between various functional modules are short, avoiding the problem of causing waste due to too long connecting cables. The monitoring unit and the direct-current main loop unit with the structure are integrated to the charging post controller formed, improving the overall reliability and safety of the monitoring unit and the direct-current main loop unit, and reducing the overall volumes thereof, which is more suitable for assembling on the production bench of the streamlined production line, and further improves the production efficiency.

Preferably, the direct-current main loop unit comprises several unit modules connected with copper bars and/other non-wiring manner. Various unit modules are mounted on a face or two faces of the monitoring unit. A direct-current main loop unit is formed by various unit modules with copper bars and/other non-wiring manner such that manufacture of the direct-current main loop unit does not require manual cable wiring, which does not only reduce losses in the transmission line between various unit modules, and facilitates assembling of various unit modules in the charging post so as to form a charging post controller with a higher degree of integration.

Preferably, the monitoring unit and the direct-current main loop unit are provided on the mounting and fixing unit with a laminated configuration structure, avoiding the problem of causing waste due to the too long connecting cable between two units, reducing losses in transmission lines, improving the assembling efficiency, further improving integration of the charging post controller, and decreasing the overall volume of the charging post controller.

Preferably, the electronic circuit comprises a central processing unit which comprises a central processor, a random access memory, a read-only memory, various I/O ports, an interruption system, a timer/counter, an A/D converter and a peripheral auxiliary circuit. A common electronic component is provided between several electronic circuits in light of actual conditions such that central processing units of various functional modules and interface circuits of various functional modules are provided simply, reducing the quantity thereof used such that the circuits are simpler, and can be arranged more compactly. Consequently, the operating rate controlled by the charging post is improved, and the human-machine exchange is more smooth, which improves the reliability and operability of the system while reducing the costs and complexity such that the overall volume of the monitoring unit is reduced by more than 50%.

Preferably, the central processing unit comprises an integrated device which comprises MCU and/or DSP and/or ARM and/or FPGA and/or SOC chips.

Preferably, the monitoring unit comprises a main control module and/or an insulation detection module and/or a voltage transmission module and/or a control power module and/or a BMS power module of a one-path or multi-path charging gun. Various functional modules are associated to form an integrated monitoring unit. Several functional modules are associated with each other so as to form a monitoring unit with comprehensive functions, wherein the main control module is used for connecting and coordinating other functional modules, the insulation detection module is used for measuring insulation during charging, the voltage transmission module is used for converting the battery voltage of the power consumption module to a standard signal required by control, the control power module provides the working power supply for various functional modules, and the BMS power module provides the working power supply for the battery management system of an automobile.

Preferably, the monitoring unit has an interface connected with an external energy metering module and/or is provided internally with the energy metering module. The energy metering module is used for detecting an output voltage, an output current, and an output electrical degree, converting analog signals of the output voltage and the output current to digital signals of the output voltage, the output current, and the output electrical degree, providing feedback signals for smart control of the direct-current main loop unit, and providing data supporting for charging. The energy metering module is provided in the monitoring unit so as to form a charging post controller with a high degree of integration. An interface connected with an external energy metering module is provided on the monitoring unit, facilitating detection of an output voltage, an output current, and an output electrical degree of the charging post by means of an external energy metering module, and further facilitating control over the charging post.

Preferably, various functional modules of the monitoring unit are provided on one or more PCBs. When there are more than one PCBs, the more than one PCBs are combined and connected, and the mounting positions and integration manner of various functional modules of the monitoring unit may be adjusted in light of actual conditions such that an integrated monitoring unit is formed, the shape structure of the charging post controller is more compact, the connection thereof is simpler, and the arrangement thereof is more reasonable, facilitating use of the controller.

Preferably, the monitoring unit is further provided thereon with a wiring terminal connected with the charging gun control loop and/or a charging direct-current module and/or an operation displaying unit. A wiring terminal is provided on the monitoring unit, facilitating connection of the monitoring unit with other devices of the charging post and making the monitoring system smart. Convenience of the terminal further reduces the difficulty in assembling the charging post.

Preferably, the direct-current main loop unit comprises a positive component and a negative component. The positive component comprises at least one positive path for connecting a charging module cathode and a power consumption cathode. The negative path comprises at least one negative path for connecting a charging module anode and a power consumption anode. The positive path and the negative path are arranged according to the cathode side and the anode side. The positive path and the negative path match with each other, forming one or more charging loops. By arranging the direct-current main loop unit into partitions according to the cathode side and the anode side, on one hand, the direct-current main loop unit is connected with the monitoring unit, allowing convenient mounting; one the other hand, the direct-current main loop unit has a high degree of integration, further reducing the overall volume of the controller.

Preferably, the direct-current main loop unit comprises a disconnect unit and/or a current detection unit and/or an over-current protection unit provided on the positive path and/or the negative path. The disconnect unit is used for controlling the ON/OFF of the current output. The current detection unit is used for sampling current parameters on a path, and feeding back signals for smart control of the direct-current output unit. The over-current protection unit is used for cutting off the current output in a timely manner when the charging loop is abnormal, protecting the normal operation of various unit modules on the charging loop, integrating the functions including break and contact, current detection, and over-current protection of the direct-current main loop unit, and further improving the degree of integration of the direct-current main loop unit.

Preferably, when there are two or more than two charging loops, adjacent positive paths are electrically connected with a positive power deployment unit, and adjacent negative paths are electrically connected with a negative power deployment unit. The positive power deployment unit and the negative power deployment unit match with each other, realizing mutual power feeding of corresponding charging loops. The current input sides of two charging loops are easily connected together by means of a power deployment unit, realizing the deployment function of the charging power, and realizing mutual power feeding of the two charging loops such that the charging power can be changed in each charging loop according to the requirements for charging, and smart charging power deployment is realized, so as to satisfy the requirements for the charging power of electric vehicles.

Preferably, the mounting and fixing unit comprises an element plate and/or a bracket and/or a protective shell. An element plate with a plate structure and/or a bracket with a supporting effect and/or a shell with a protective effect may be used separately or in combination as a mounting and fixing unit in light of actual conditions, easily realizing respective integrated mounting or overall integrated mounting of various functional modules and unit modules.

Preferably, the mounting and fixing unit comprises at least one rotating hinge which is provided between the monitoring unit and the direct-current main loop unit. The monitoring unit rotates relative to the direct-current main loop unit when the rotating hinge rotates. A rotating hinge is provided between the monitoring unit and the direct-current main loop unit such that the monitoring unit rotates relative to the direct-current main loop unit when the rotating hinge rotates. On the one hand, this facilitates integration of the monitoring unit and the direct-current main loop unit, and on the other hand, this also facilitates separate maintenance and replacement of the monitoring unit and the direct-current main loop unit.

Preferably, several retaining members are also included. The retaining members are used for limiting rotation of the monitoring unit relative to the direct-current main loop unit. Retaining members are provided such that after the monitoring unit and the direct-current main loop unit rotate to proper positions, locking is carried out by the retaining members such that the monitoring unit and the direct-current main loop unit have stable structures during use, and the normal use of the monitoring unit and the direct-current main loop unit is ensured.

Preferably, the mounting and fixing unit is provided thereon with several grounding connectors. The grounding connectors are provided to ensure the safe and normal operation of the controller and facilitate grounding connection of the charging gun.

The charging post comprises a cabinet which is provided therein with at least one charging module. The cabinet is provided thereon with at least one charging gun. The cabinet is provided therein with at least one charging post controller with various functional modules connected by means of a PCB as in any of above. One end of the charging post controller is electrically connected with a charging module, while the other end thereof is electrically connected with a charging gun.

With the charging post controller above used, the charging post in the present utility model has a high degree of integration, a small overall volume, a low overall cost, and easy promotion and application. Meanwhile, the manufacture process is simple and suitable for streamlined production and has a reduced cost of production. In addition, the safety and reliability are high, and the using effect is good.

To sum up, due to use of the technical solutions above, the charging post controller with various functional modules connected by means of a PCB in the present utility model has the beneficial effects as follows:

1. The monitoring unit and the direct-current main loop unit are integrated on a mounting and fixing unit such that the charging post controller formed has a compact structure, a small volume, and a broad applicable scope;
2. Electric connection of various functional modules is realized by PCBs such that the connecting lines of various functional modules are short, improving the reliability and rate of signal transmission and promoting power density of the controller, and causing that the monitoring unit with said structure is more compact and the work efficiency of the controller is better;
3. Manual wire distribution and wiring when the controller is made are reduced such that the controller can be produced in a streamlined manner, the manufacture process is simple, the cost for manufacture is reduced, the production efficiency is improved, and the comprehensive cost of the controller is reduced.

The charging post in the present utility model has the beneficial effects as follows:

1. a high degree of integration, a small overall volume, a low comprehensive cost, and easy promotion and application;
2. simple manufacture process, suitable for streamlined production, and a reduced cost of production;
3. high safety and reliability and good using effect.

Figure 1:
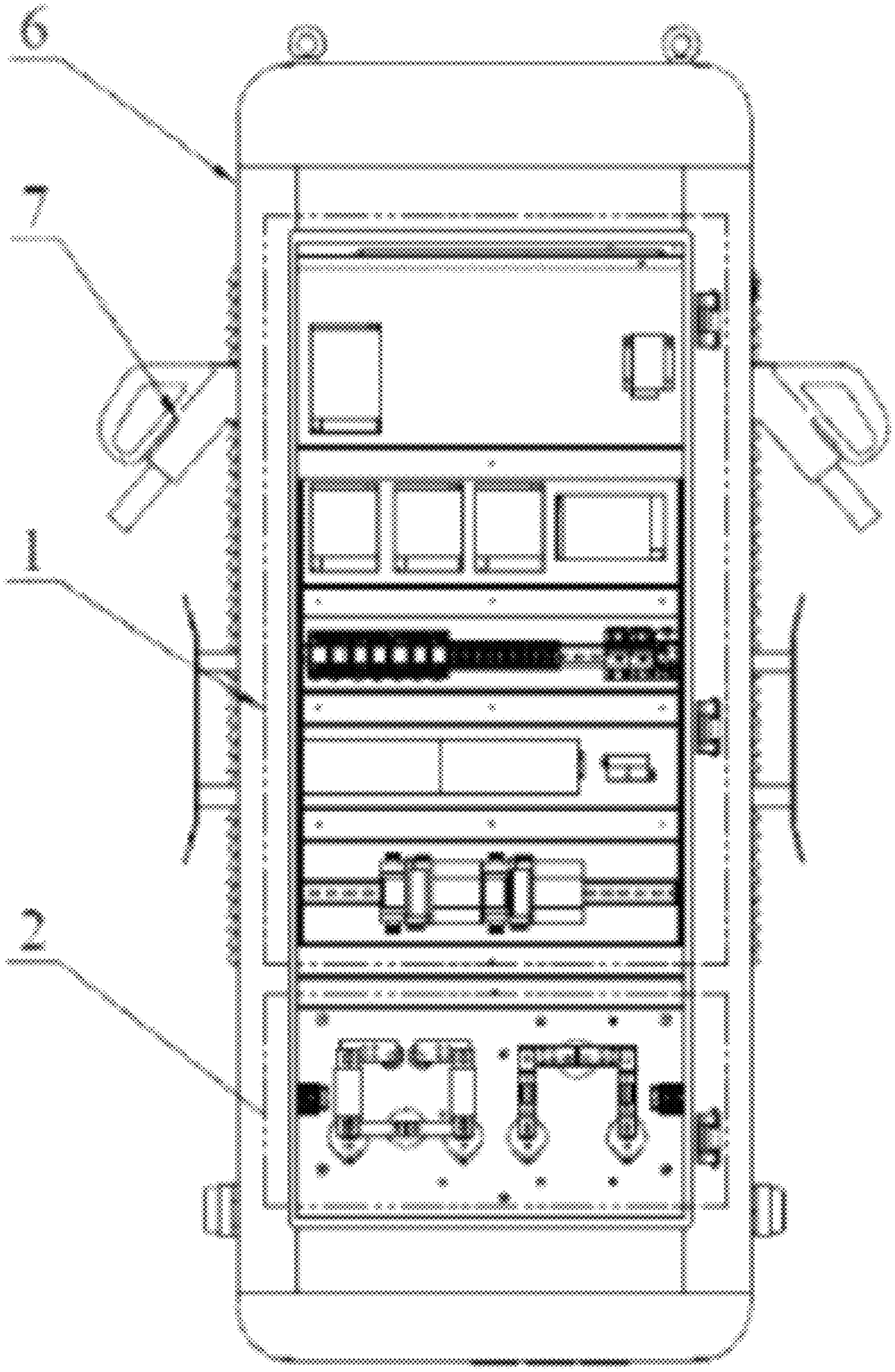
FIG. 1 is a schematic diagram of the inner structure of an existing charging post provided with two charging guns.
Figure 2:
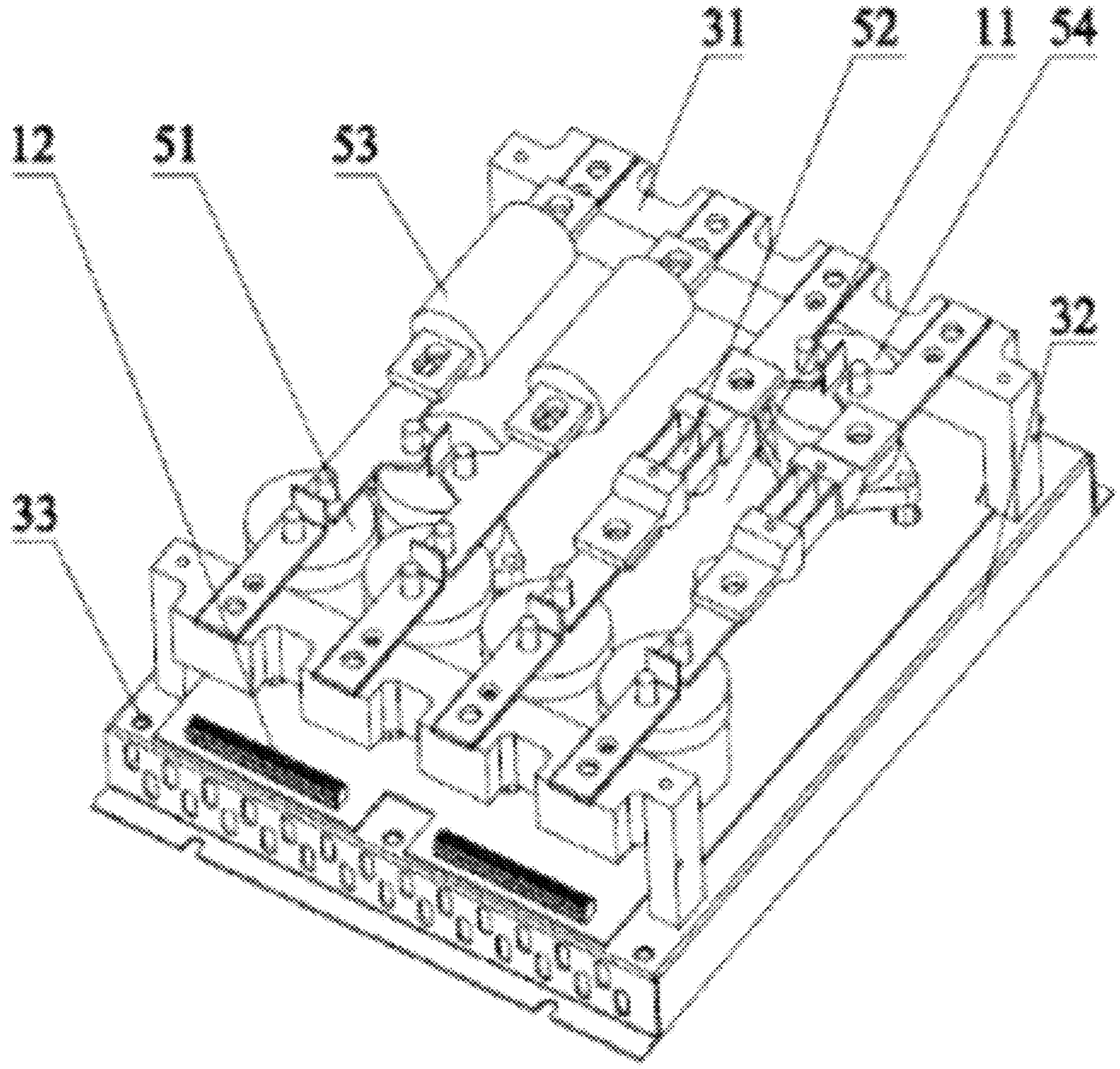
FIG. 2 is a schematic diagram of the structure of the charging post controller of Example 1.
Figure 3:
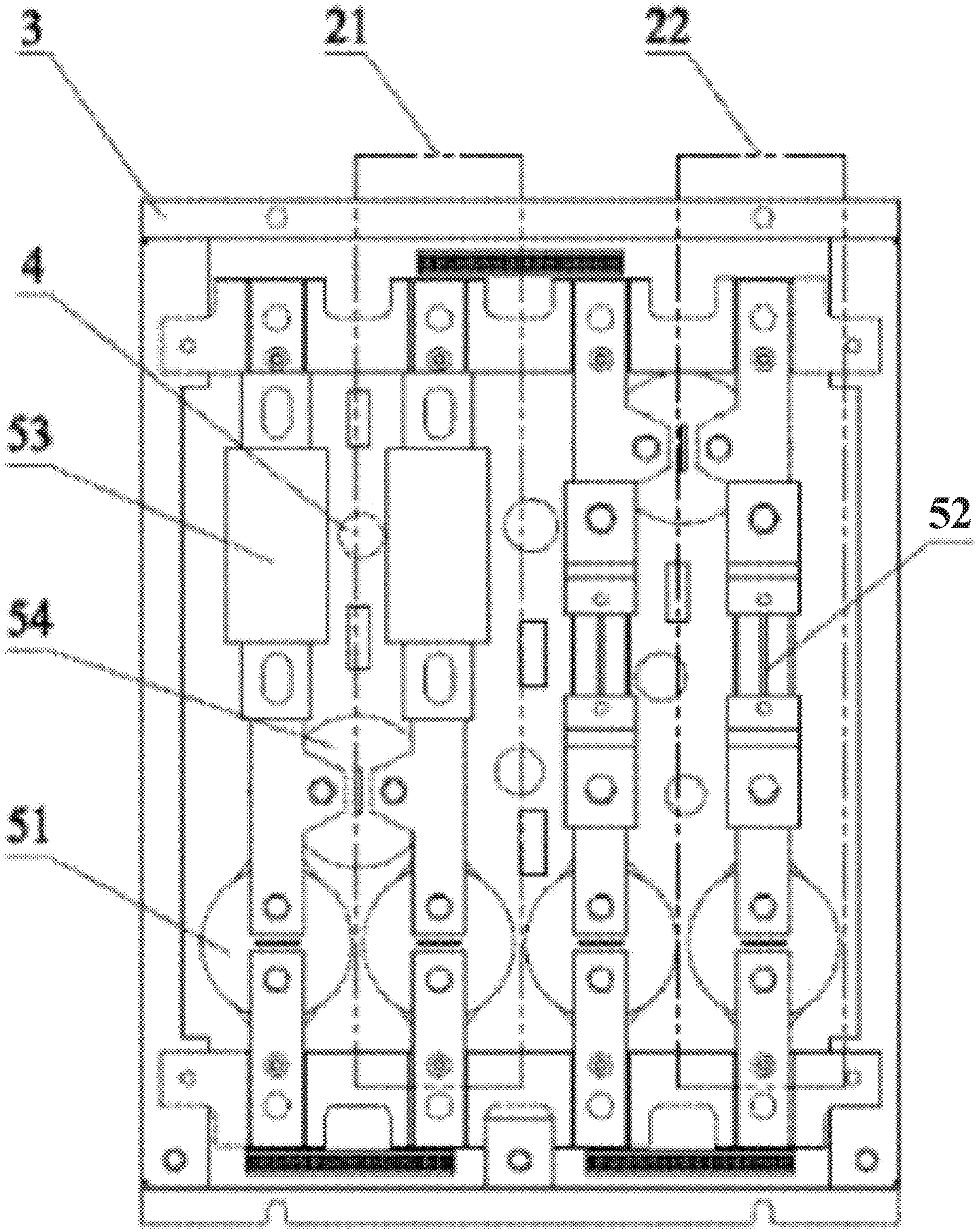
FIG. 3 is a schematic diagram of the structure from another perspective of FIG. 2.
Figure 4:
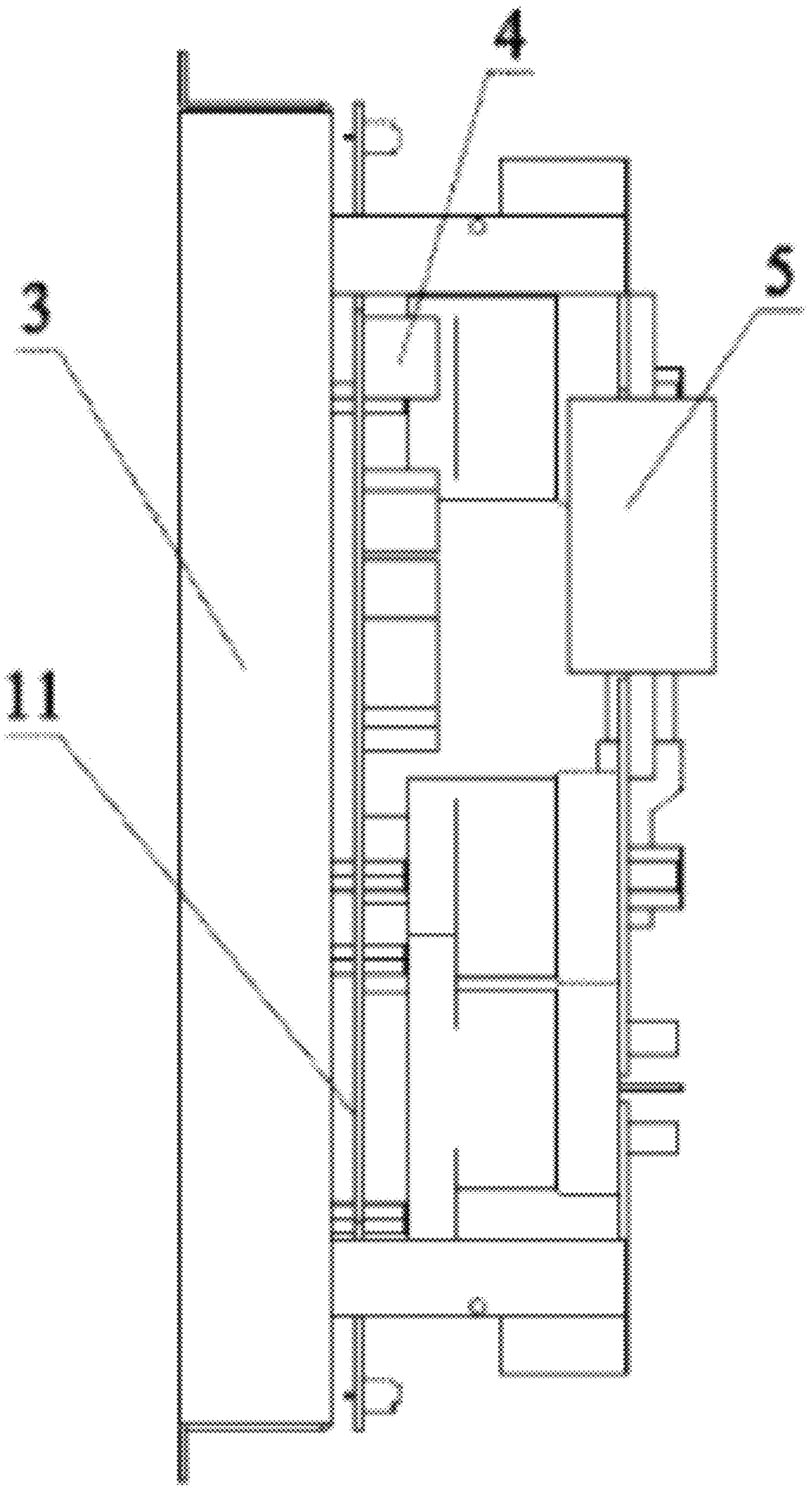
FIG. 4 is a schematic diagram of the structure from another perspective of FIG. 3.
Figure 5:
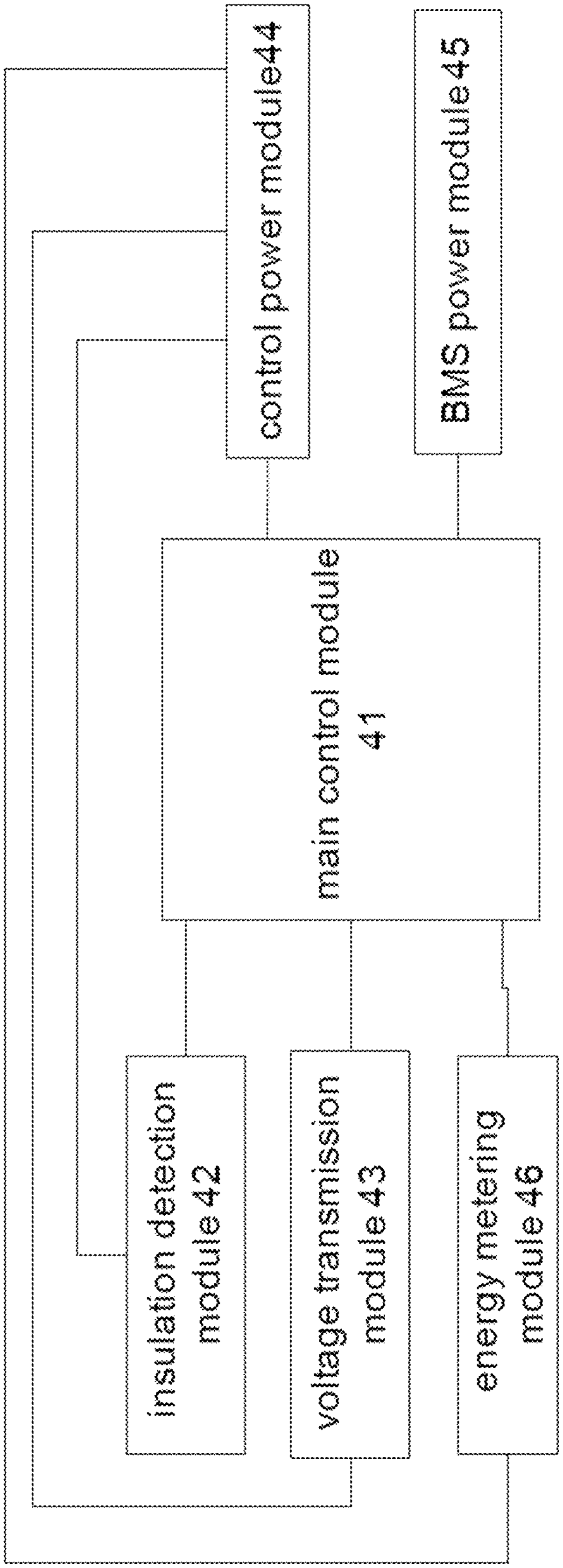
FIG. 5 is a schematic diagram of the composition of a monitoring unit in the present utility model.
Figure 6:
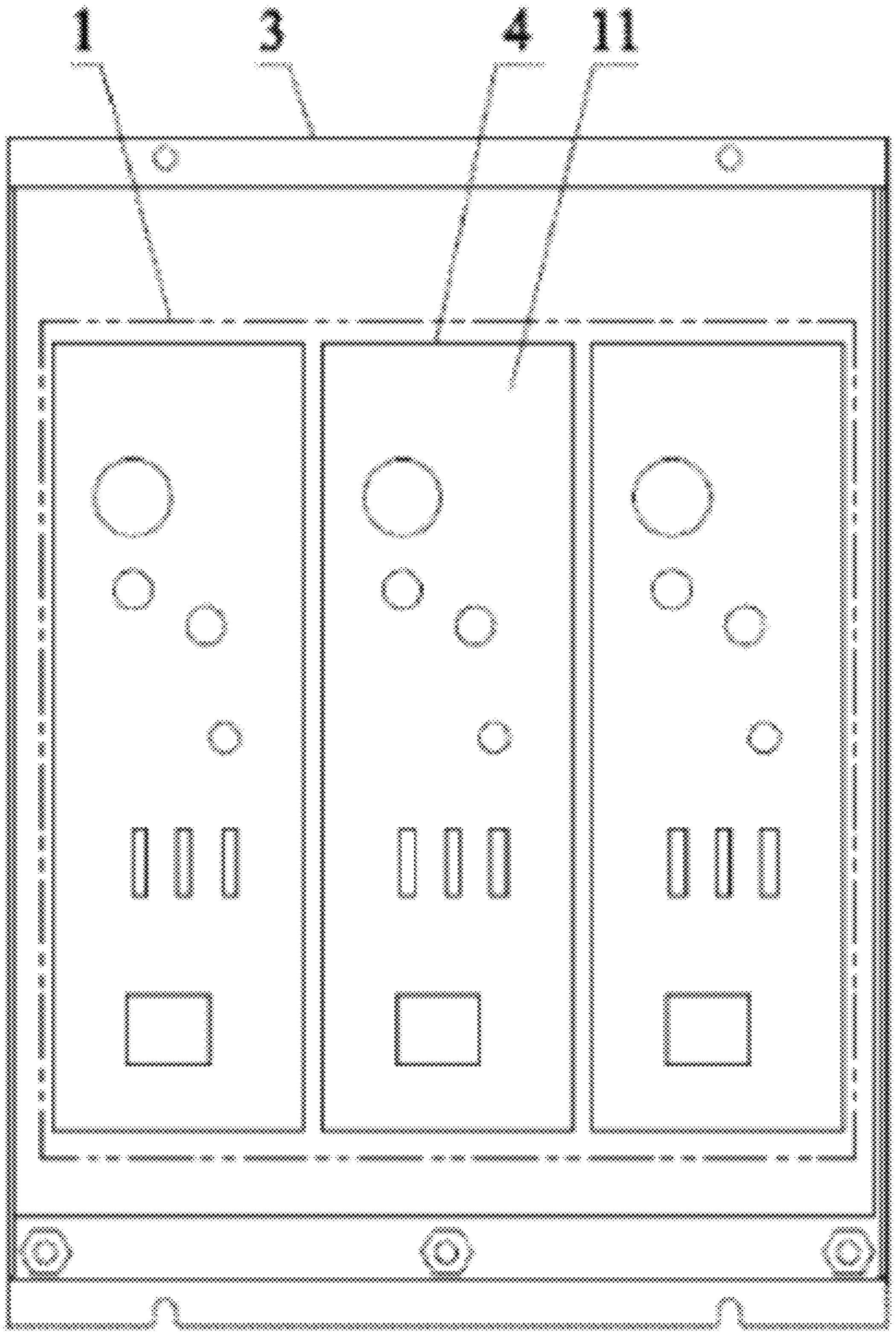
FIG. 6 is a schematic diagram of the structure of the monitoring unit in Example 1.
Figure 7:
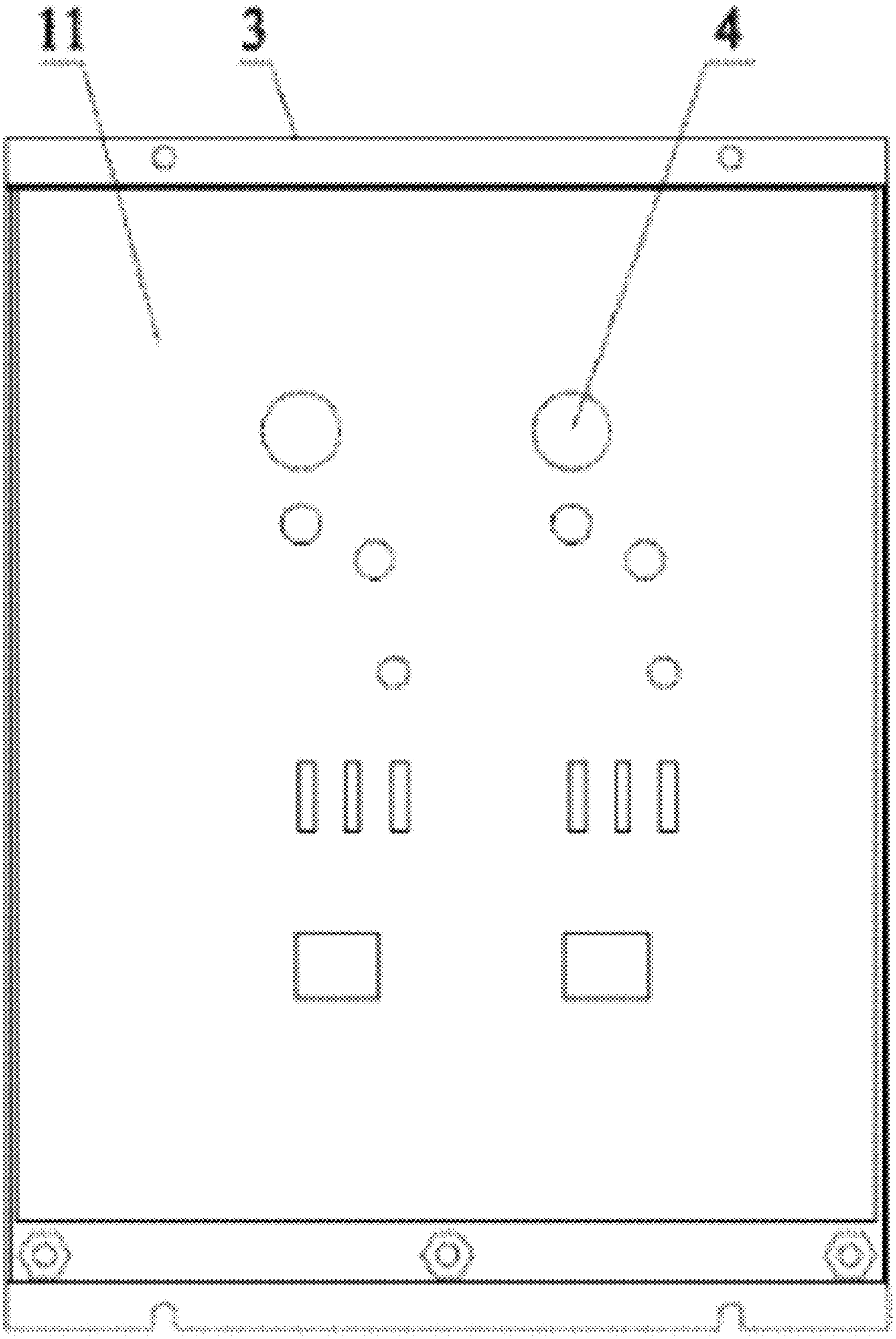
FIG. 7 is a schematic diagram of the structure of the monitoring unit in Example 2.
Figure 8:
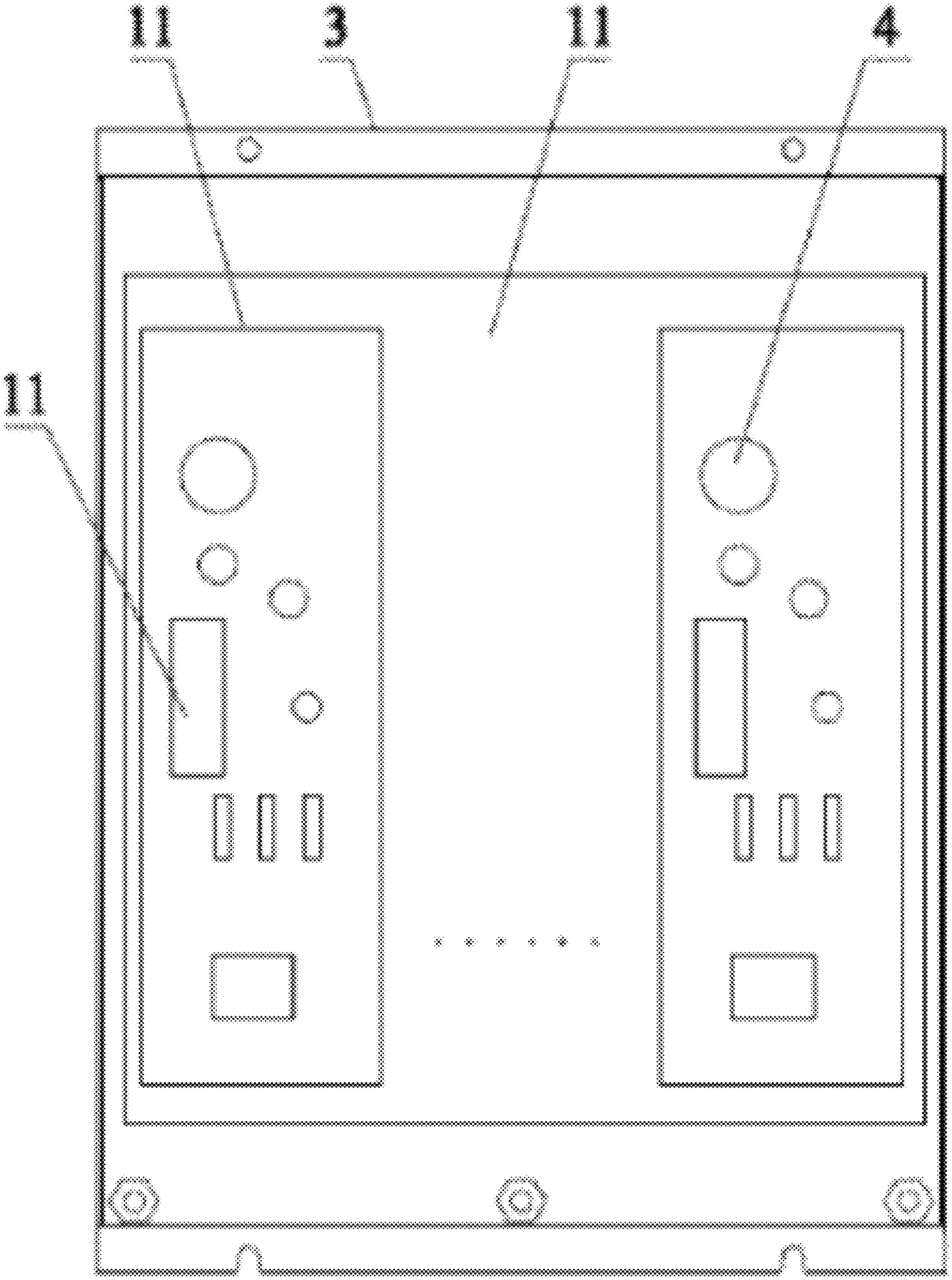
FIG. 8 is a schematic diagram of the structure of the charging post controller with another exemplary effect in Example 2.

Reference signs: 1—monitoring unit; 11—PCB; 12—wiring terminal; 2—direct-current main loop unit; 21—positive path; 22—negative path; 3—mounting and fixing unit; 31—bracket; 32—element plate; 33—grounding connector; 34—rotating hinge; 35—retaining member; 36—protective shell; 4—functional module; 41—main control module; 42—insulation detection module; 43—voltage transmission module; 44—control power module; 45—BMS power module; 46—energy metering module; 5—unit module; 51—disconnect unit; 52—current detection unit; 53—overcurrent protection unit; 54—power deployment unit; 6—cabinet; 7—charging gun; 8—charging post controller.

EXAMPLES

To make the object, the technical solutions and advantages of the present utility model clearer, the present utility model would be further explained in a detailed manner by combining the figures and examples. It should be understood that the examples described herein were only used for explaining the present utility model other than limiting the present utility model.

Example 1

As shown in FIGS. 2 to 6, a charging post controller with various functional modules connected by means of a PCB comprised a monitoring unit 1, a direct-current main loop unit 2 and a mounting and fixing unit 3 associated with each other. A laminated arrangement structure was formed between the monitoring unit 1, the direct-current main loop unit 2, and the mounting and fixing unit 3. The monitoring unit 1 comprised several functional modules 4 formed by combining a PCB 11 and an electronic circuit, the functional modules 4 being electrically connected by means of the PCB 11. The several functional modules 4 were mounted on one face or two faces of the mounting and fixing unit 3. The direct-current main loop unit 2 comprised several unit modules 5 connected with copper bars and/other non-wiring manner. Various unit modules 5 were mounted on a face or two faces of the monitoring unit 1.

As for the charging post controller with various functional modules connected by means of a PCB in the Example, unit modules 5 connected with whole copper bars were preferably used to form a direct-current main loop unit 2. Also, various unit modules 5 were connected with, e.g., non-wiring manners such as connection with bus bars having screws and/or wires having screws, in light of actual conditions. Monitoring unit 1 was formed by functional module 4 which was combined by PCB 11 and an electronic circuit. Preferably, the monitoring unit 1 and the direct-current main loop unit 2 were provided on the same face of the mounting and fixing unit 3, and the monitoring unit 1 was mounted between the direct-current main loop unit 2 and the mounting and fixing unit 3, facilitating mounting and fixation of the integrated controller in the charging post 7 by means of the mounting and fixing unit 3. Also, the relative positions for arranging the monitoring unit 1, the direct-current main loop unit 2, and the mounting and fixing unit 3 may be adjusted in light of actual conditions. For example, the direct-current main loop unit 2 and the monitoring unit 1 were mounting on both sides of the mounting and fixing unit 3, respectively, thereby adjusting the volume of the overall structure of the controller which was integrated. This facilitated mounting and use of the controller, and was also good to broad the applicable scope of the controller. Meanwhile, in the Example, a plurality of monitoring units 1 may be further provided in the controller to combine a plurality of direct-current main loop units 2 in light of actual conditions, realizing normal charging of a plurality of charging guns 7 such that the controller had a high degree of integration.

Preferably, the monitoring unit 1 comprised main control module 41, an insulation detection module 42, a voltage transmission module 43, a control power module 44, and a BMS power module 45 of a one-path or multi-path charging gun. Various functional modules 4 were associated to form an integrated monitoring unit 1. In the Example, the quantity of monitoring unit(s) 1 was arranged according to the quantity of charging gun(s) 7 such that the monitoring unit(s) 1 corresponded to the charging gun(s) 7. The use state of the charging gun(s) 7 was monitored to ensure the normal use of the charging post. A structure consisting of PCB 11 and an electronic circuit may be used for one or more of the various functional modules 4 in light of actual conditions such that the volume of the monitoring unit 1 may be adjusted in light of actual conditions. Subsequently, the monitoring unit 1 with said structure had a broader applicable scope. In the Example, an electronic circuit in the WZK-II with the existing models may be selected or referred to for the main control module 41. An electronic circuit in the LRS-200-24 with the existing models may be selected or referred to for the control power module 44. An electronic circuit in the UIMD01+USLD1S1 with the existing models may be selected or referred to for the insulation detection module 42. An electronic circuit in the LF-DV11 with the existing models may be selected or referred to for the voltage transmission module 43. An electronic circuit in the LRS-200-12 with the existing models may be selected or referred to for the BMS power module 45. The electronic circuits of the main control module 41, a control power module 44, an insulation detection module 42, a voltage transmission module 43, and a BMS power module 45 with existing models were arranged in an integrated manner. Further, when the requirements for monitoring the functional performance of the monitoring unit 1 were satisfied, electronic circuits of the aforesaid functional modules 4 were replaced with a simpler electronic circuit 2 with higher cost-performance ratio and reliability so as to achieve better arrangement effects so that an electronic circuit set in functional modules 4 was integrated on one or more PCBs 11. Various functional modules 4 were electrically connected with each other by means of tracing within the PCB 11 or an on-board connector, forming an integrated monitoring unit 1, which achieved the operating effects of the original functional modules 4, greatly reduced the overall volume of the monitoring unit 1, and facilitated adjustment of the models of electrical elements on various electronic circuits according to the environment where various monitoring units 1 were applied, thereby forming monitoring units 1 adaptable to use of charging posts within different power frequency bands.

Preferably, a functional module 4 of the monitoring unit 1 consisted of PCB 11 and an electronic circuit, and was integrated on a PCB 11. In the Example, the functional module 4 consisted of PCB 11 and an electronic circuit, and the functional module 4 was provided on a PCB. Electrical connection was realized by means of tracing within PCBs and/or an on-board connector such that the controller had a high degree of integration.

The monitoring unit 1 has an interface connected with an energy metering module 46 (preferably, an external energy metering module). An interface connected with the energy metering module 46 provided on the monitoring unit 1 facilitates detection of an output voltage, an output current, and an output electrical degree of the charging post by means of the external energy metering module, and further facilitates control over the charging post.

Preferably, the monitoring unit 1 was further provided with a wiring terminal 12 connected with a charging gun control loop and/or a charging direct-current module and/or an operation displaying unit. Several connecting terminals 12 were preferably provided on the edge of the controller in the Example, facilitating connection of the controller with other devices of the charging post, and making the monitoring system smart. The difficulty in assembling the charging post was further reduced due to the convenience of the terminal.

Preferably, the mounting and fixing unit 3 comprised a bracket 31 and an element plate 32 where several grounding interfaces 33 were provided. A combination of a bracket 31 and an element plate 32 with a plate structure was preferably used in the Example to mount the direct-current main loop unit 2 on the bracket 31, and mount the bracket on the element plate 32, mounting a laminated arrangement structure of the monitoring unit 1 and the direct-current main loop unit 2. The position for mounting the bracket 31 on the element plate 32 may be changed in light of actual conditions, and the positions for mounting the monitoring unit 1 and the direct-current main loop unit 2 may be readily adjusted, exhibiting convenient mounting and adjustment.

Preferably, the mounting and fixing unit 3 was provided thereon with several grounding connectors 33. The grounding connectors 33 were provided to facilitate grounding connection of the controller and facilitate grounding connection of the charging gun 7, to ensure safe and normal operation of the controller and charging gun 7.

The monitoring unit 1 may be provided internally with an energy metering module 46. In the Example, an interface connected with an external energy metering module is preferably provided on the monitoring unit 1, while the energy metering module 46 provided in the monitoring unit 1 is such that the controller has more comprehensive functions, a higher degree of integration, and a wider applicable scope.

Example 2

As shown in FIGS. 2 to 8, the charging post controller with various functional modules connected by means of a PCB in the Example had the same structure as that in Example 1, and they differed from each other in: the electronic circuits of various functional modules 4 of the monitoring unit 1 were integrated on a PCB 11, and were electrically connected with each other by means of tracing within the PCB 11.

As for the charging post controller with various functional modules connected by means of a PCB in the Example, the controller had a higher degree of integration and more convenient assembling by integrating the electronic circuits of functional modules of the monitoring unit 1 on a PCB 11. The electronic circuits of a plurality of monitoring units 1 were preferably integrated on a PCB 11, realizing monitoring of the charging states of a plurality of charging guns 7.

Preferably, various functional modules of the monitoring unit 1 were provided on multiple PCBs 11 which were combined and connected, forming an integrated monitoring unit 1. Two or more functional modules 4 may be integrated on a PCB 11 according to the similarities such as the models and functions of various functional modules 4 by providing the various functional modules 4 on multiple PCBs 11, and then the multiple PCBs 11 were combined in the neighborhood and/or connected with each other in a stack-up manner. Tracing connection and/or connection with an on-board connector within a PCB 11 was carried out, facilitating mounting of various functional modules and facilitating assembling and manufacturing of the controller.

Example 3

As shown in FIGS. 2 to 11, a charging post controller with various functional modules connected by means of a PCB in the Example had the same structure as that in Example 1, and they differed from each other in: the direct-current main loop unit 2 comprised a positive component and a negative component. The positive component comprised at least one positive path 21 for connecting a charging module cathode and a power consumption cathode, and the negative component comprised at least one negative path 22 for connecting a charging module anode and a power consumption anode. The positive path 21 and the negative path 22 were arranged according to the cathode side and the anode side. The positive path 21 and the negative path 22 matched with each other, forming one or more charging loops.

With a charging post controller with various functional modules connected by means of a PCB in the Example, preferably, the positive path 21 and the negative path 22 were provided in parallel by arranging the direct-current main loop unit 2 according to the cathode side and the anode side such that a unit module 5 consisting of the positive path 21 and the negative path 22 was nearer, facilitating connection with copper bars. Manual wire distribution was not required. This facilitated separate assembling of the direct-current main loop unit 2, and then mounting thereof on the mounting and fixing unit 3, and further facilitated manufacturing of the controller.

Preferably, the direct-current main loop unit 2 comprised a disconnect unit 51 and/or a current detection unit 52 and/or an over-current protection unit 53 provided on the positive path 21 and/or the negative path 22. The positive path 21 in the Example comprised a charging module cathode connecting unit, an over-current protection unit 53, a disconnect unit 51, and a power consumption module cathode connecting unit electrically connected in turn, and the negative path 22 comprised a charging module anode connecting unit, a current detection unit 52, a disconnect unit 51, and a power consumption module anode connecting unit electrically connected in turn.

Preferably, the quantity of the charging loops was two. Adjacent positive paths 21 were electrically connected with a positive power deployment unit, and adjacent negative paths 22 were electrically connected with a negative power deployment unit. The positive power deployment unit and the negative power deployment unit matched with each other, realizing mutual power feeding of corresponding charging loops. In the Example, two charging loops were provided, the positive paths 21 and the negative paths 22 were mounted in parallel according to the manner where cathodes were arranged and anodes were arranged, and the current input sides of two charging loops were connected together by means of a power deployment unit 54, realizing the deployment function of the charging power, and realizing mutual power feeding of the two charging loops such that a stable current could be formed in each charging loop, and two charging guns could be powered normally.

Example 4

Figure 9:
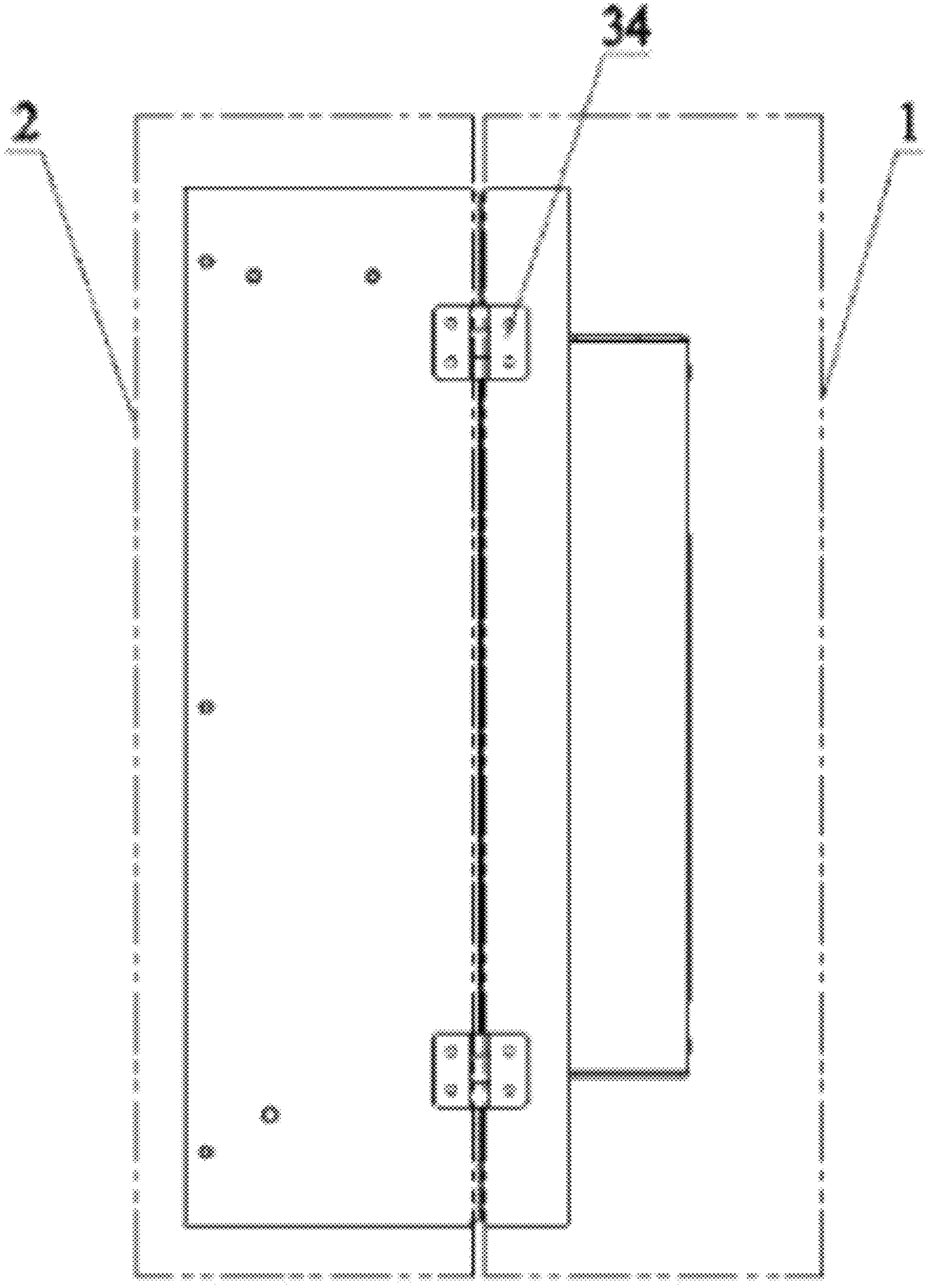
FIG. 9 is a schematic diagram of the structure of the charging post controller in Example 4.
Figure 10:
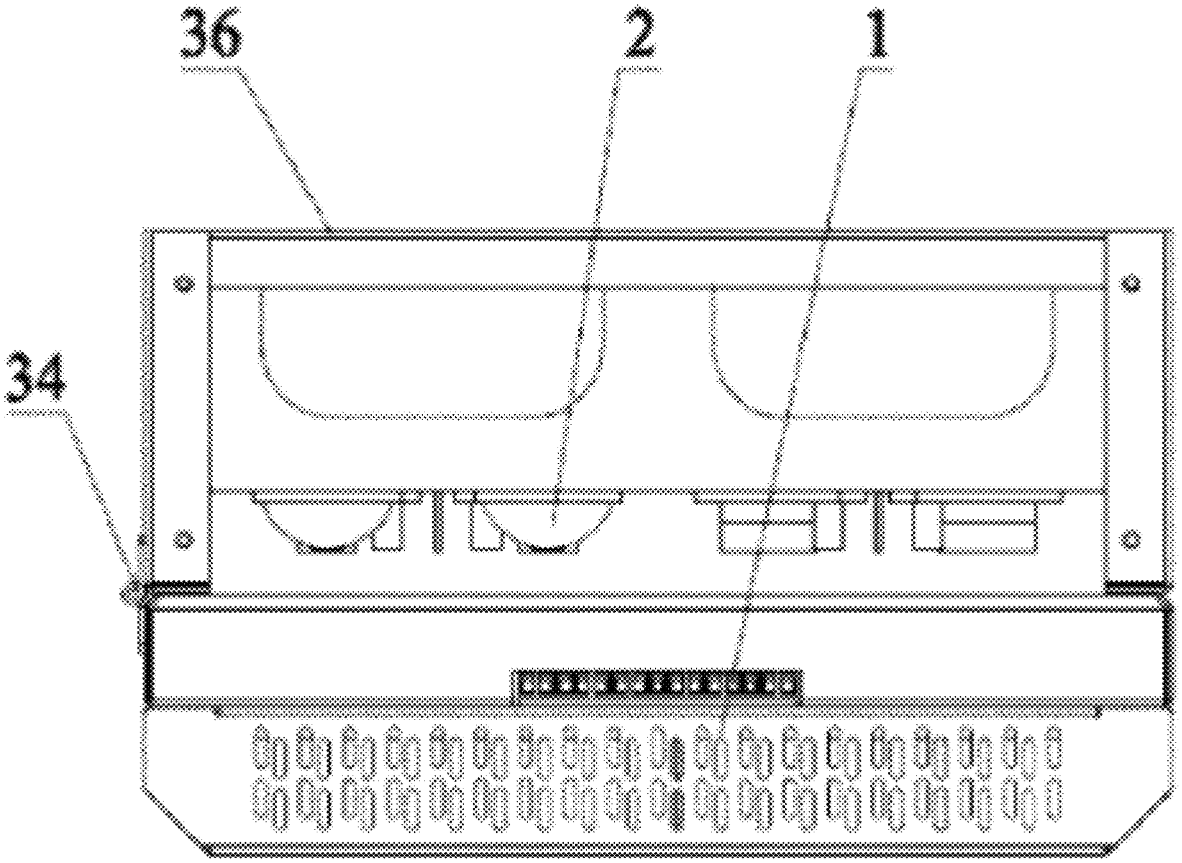
FIG. 10 is a schematic diagram of the structure from another perspective of FIG. 9.
Figure 11:
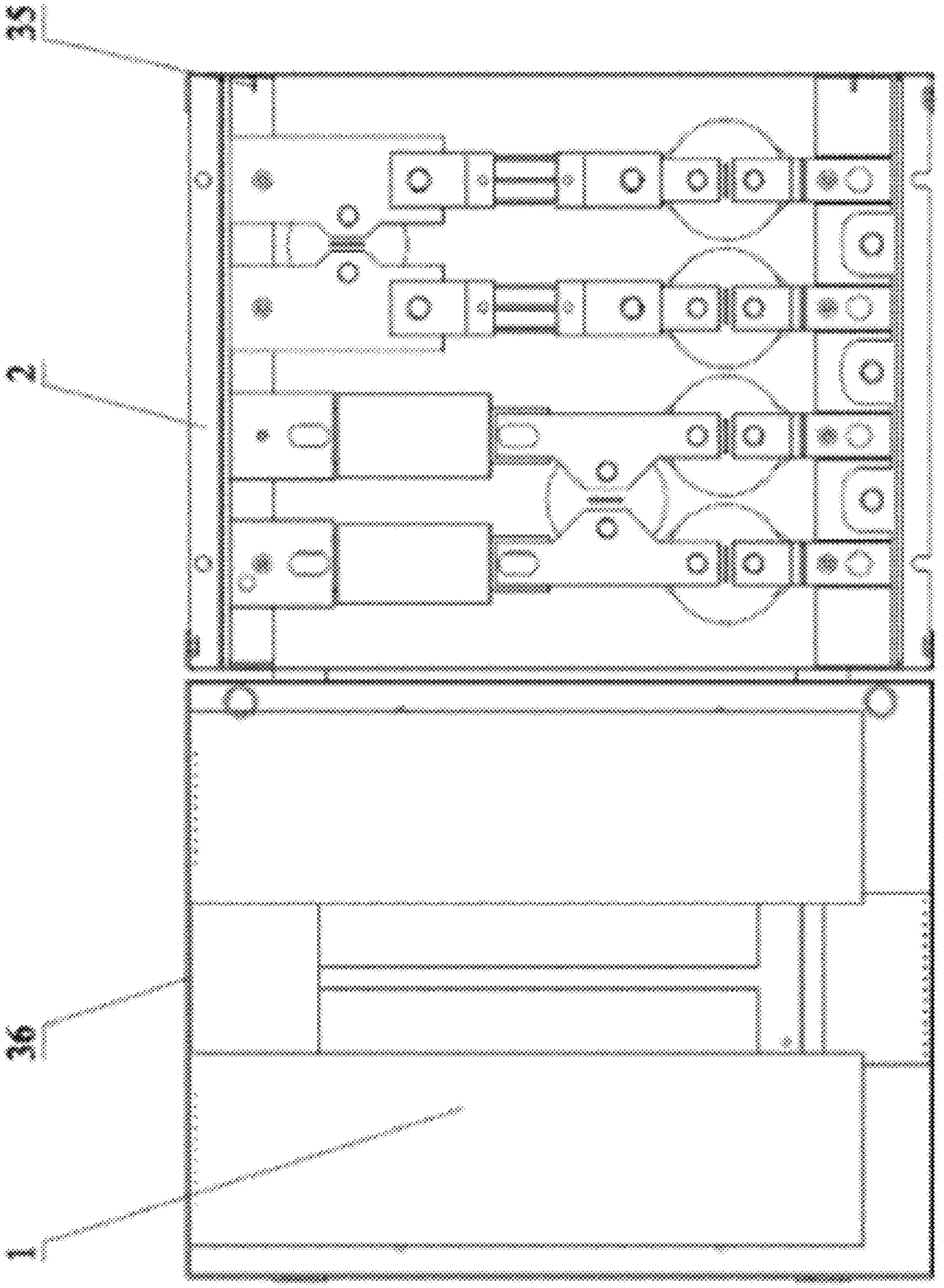
FIG. 11 is a schematic diagram of the structure after the charging post controller in Example 4 is unfolded.
Figure 12:
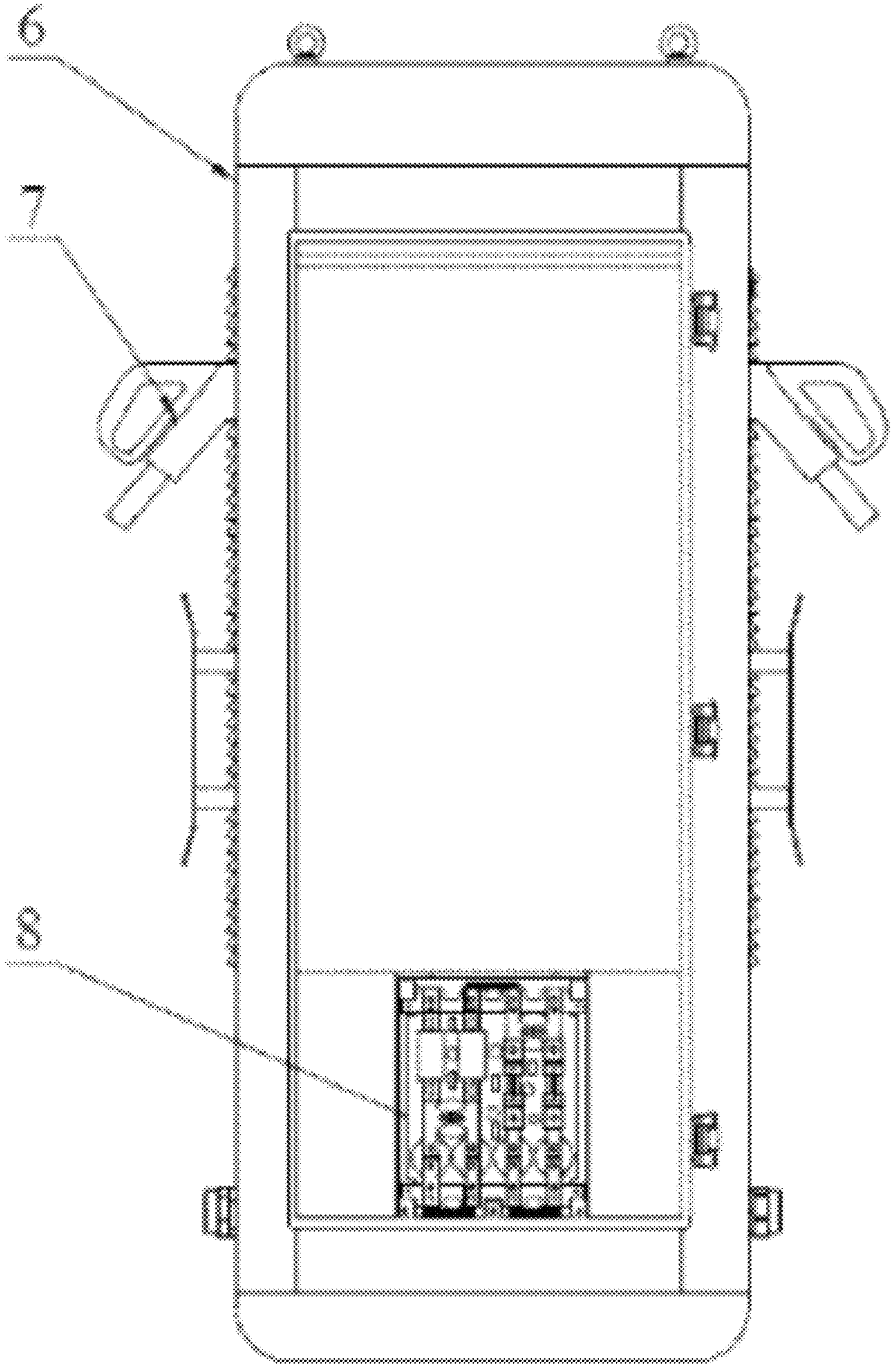
FIG. 12 is a schematic diagram of the structure of the charging post in Example 5.

As shown in FIGS. 9 to 11, the charging post controller with various functional modules connected by means of a PCB in the Example had the same structure as that in Example 1, and they differed from each other in: the mounting and fixing unit 3 comprised at least one rotating hinge 34 which was provided between the monitoring unit 1 and the direct-current main loop unit 2. The monitoring unit 1 rotated relative to the direct-current main loop unit 2 when the rotating hinge 34 rotated.

In the charging post controller with various functional modules connected by means of a PCB in the Example, the monitoring unit 1 and the direct-current main loop unit 2 each comprised respective functional module 4 and unit module 5, and after integrated connection thereof, were provided within respective protective shell 36. Electrical connection of the monitoring unit 1 and the direct-current main loop unit 2 was realized by means of cable wiring. Meanwhile, two rotating hinges 34 were provided between the monitoring unit 1 and the direct-current main loop unit 2 such that the monitoring unit 1 rotated relative to the direct-current main loop unit 2 when the rotating hinge 34 rotated. As a result, a controller with a flip structure consisting of a monitoring unit 1, a direct-current main loop unit 2, and a rotating hinge 34 was formed. When the flip structure was rotated to be open, the inner structures of the monitoring unit 1 and the direct-current main loop unit 2 could be readily observed, facilitating separate maintenance and replacement of the monitoring unit 1 and the direct-current main loop unit 2. When the flip structure was rotated to be closed, the monitoring unit 1 and the direct-current main loop unit 2 could be readily limited within the protective shell 36 by means of the protective shell 36, improving the overall protective effect of the controller, improving the integrative effect of the controller, and ensuring normal use of the controller.

Preferably, several retaining members 35 were included. The retaining members 35 were detachably connected with the rotating hinge 34, limiting rotation of the monitoring unit 1 relative to the direct-current main loop unit 2. The monitoring unit 1 and the direct-current main loop unit 2 were locked and fixed by means of the retaining members 35 after the monitoring unit 1 and the direct-current main loop unit 2 were rotated until the controller was closed by arranging the retaining members 35 to be connected with the rotating hinge 34. An integrated structure was maintained such that the structure of the controller was stable during use, and the normal use of the controller was ensured. The retaining members 35 may be screws and/or bolts and/or other structures with connection and locking functions.

Example 5

As shown in FIGS. 2 to 12, the charging post comprised a cabinet 6 which was provided therein with at least one charging module. The cabinet 6 was provided thereon with at least one charging gun 7. The cabinet 6 was provided therein with at least one charging post controller with various functional modules connected by means of a PCB as in any of above. One end of the charging post controller 8 was electrically connected with a charging module, while the other end thereof was electrically connected with a charging gun 7.

The charging post in the Example was further provided with an operation displaying unit, by means of which, the monitoring unit 1 of the charging post controller 8 was connected with the operation displaying unit. Moreover, a port connected with the outside was preserved to connect one end of the direct-current loop unit 2 of the charging post controller 8 with the charging module and connect the other end thereof with the charging gun 7, realizing assembling of the charging post. As the charging post controller 8 had a small structure, the comprehensive cost thereof was low and was convenient for promotion and application.

The Examples above are only used for explaining the present utility model other than limiting the technical solution described in the present utility model. Although the present utility model has been explained in a detailed manner in the description by making reference to the Examples above, the present utility model is not limited to the examples above. Thus, as for any modifications or equivalent replacements of the present utility model, the technical solutions and improvements thereof without departing from the spirit and scope of the present utility model shall be covered within the scope of the claims in the present utility model.

The invention claimed is:

1. A charging post controller with functional modules connected by a PCB, comprising a monitoring unit, a direct-current main loop unit and a mounting and fixing unit which are associated with each other, the monitoring unit comprising functional modules formed by combining a PCB and an electronic circuit, the functional modules being electrically connected by the PCB, and some or all of the functional modules being mounted on the mounting and fixing unit, such that a laminated arrangement structure is formed between the monitoring unit, the direct-current main loop unit and the mounting and fixing unit, wherein the direct-current main loop unit comprises unit modules, each of the unit modules being mounted on a face or two faces of the monitoring unit, and the mounting and fixing unit comprises an element unit, a bracket and/or a protective shell.

2. The charging post controller of claim 1, wherein the modules are connected with copper bars.

3. The charging post controller of claim 1, wherein the monitoring unit comprises at least one of a main control module, an insulation detection module, a voltage transmission module, a control power module, or a BMS power module of a one-path or multi-path charging gun.

4. The charging post controller of claim 3, wherein the monitoring unit has an interface connected with an energy metering module.

5. The charging post controller of claim 1, wherein the functional modules of the monitoring unit are provided on the first PCB and one or more additional PCBs, and the first PCB and the one or more additional PCBs are combined and connected to form an integrated monitoring unit.

6. The charging post controller of claim 5, wherein the monitoring unit is further provided with a wiring terminal connected with at least one of a charging gun control loop, a charging direct-current module, and an operation displaying unit.

7. The charging post controller of claim 1, wherein the direct-current main loop unit comprises (i) a positive component comprising at least one positive path for connecting a charging module positive electrode and a power consumption module positive electrode and (ii) a negative component comprising at least one negative path for connecting a charging module negative electrode and a power module negative electrode, wherein the positive path and the negative path match with each other to form one or more charging loops.

8. The charging post controller of claim 7, wherein the direct-current main loop unit comprises at least one of a disconnect unit, a current detection unit, and an over-current protection unit on the positive path, the negative path, or both the positive path and the negative path.

9. The charging post controller of claim 7, wherein when a number of the charging loops is two or more, adjacent positive paths are electrically connected with a positive power deployment unit, and adjacent negative paths are electrically connected with a negative power deployment unit, and the positive power deployment unit and the negative power deployment unit match with each other to realize mutual power feeding of corresponding ones of the charging loops.

10. The charging post controller of claim 1, wherein the mounting and fixing unit comprises at least one rotating hinge between the monitoring unit and the direct-current main loop unit, the monitoring unit rotating relative to the direct-current main loop unit when the rotating hinge rotates.

11. The charging post controller of claim 10, further comprising retaining members for limiting rotation of the monitoring unit relative to the direct-current main loop unit.

12. The charging post controller of claim 10, wherein the mounting and fixing unit has a plurality of grounding connectors thereon.

13. The charging post controller of claim 11, wherein the mounting and fixing unit has a plurality of grounding connectors thereon.

14. A charging post comprising a cabinet provided thereon with at least one charging gun, wherein the cabinet is provided therein with the charging post controller of claim 1.

15. The charging post controller of claim 1, wherein the modules are connected with non-wiring connections.

16. The charging post controller of claim 1, wherein the monitoring unit comprises some or all of the functional modules, associated to form an integrated monitoring unit.

17. The charging post controller of claim 4, wherein the energy metering module comprises an energy metering module or an internal energy metering module.

18. The charging post controller of claim 7, wherein the positive path and the negative path arranged according to a positive side and a negative side.

19. The charging post controller of claim 1, wherein the electronic circuit comprises a central processor, a random access memory, a read-only memory, I/O ports, a timer or counter, and an analog/digital converter.

20. The charging post controller of claim 19, wherein the electronic circuit further comprises an interruption system and a peripheral auxiliary circuit.

* * * * *